United States Patent
Fang et al.

(10) Patent No.: US 8,626,206 B2
(45) Date of Patent: Jan. 7, 2014

(54) PAGING MECHANISMS FOR MOBILE STATIONS WITH MULTIPLE SUBSCRIPTIONS

(75) Inventors: Yonggang Fang, San Diego, CA (US); Xiaowu Zhao, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 0 days.

(21) Appl. No.: 13/620,415

(22) Filed: Sep. 14, 2012

(65) Prior Publication Data

US 2013/0072236 A1 Mar. 21, 2013

Related U.S. Application Data

(63) Continuation of application No. 12/701,327, filed on Feb. 5, 2010, now Pat. No. 8,290,518.

(60) Provisional application No. 61/150,256, filed on Feb. 5, 2009.

(51) Int. Cl.
*H04W 68/00* (2009.01)
*H04W 72/00* (2009.01)

(52) U.S. Cl.
USPC .......................................... 455/458; 455/450

(58) Field of Classification Search
USPC .................................. 455/450, 458
See application file for complete search history.

(56) References Cited

U.S. PATENT DOCUMENTS

| | | | | |
|---|---|---|---|---|
| 5,764,730 | A * | 6/1998 | Rabe et al. ..................... | 455/403 |
| 6,792,278 | B1 * | 9/2004 | Ahmavaara et al. .......... | 455/461 |
| 7,142,879 | B2 * | 11/2006 | Watanabe et al. ............. | 455/458 |
| 7,184,772 | B2 * | 2/2007 | Lim et al. ...................... | 455/450 |
| 7,797,002 | B2 * | 9/2010 | Take .............................. | 455/458 |
| 7,894,338 | B2 * | 2/2011 | Ljung et al. ................... | 370/230 |
| 8,463,277 | B2 | 6/2013 | Huang et al. | |
| 2004/0002340 | A1 | 1/2004 | Lim et al. | |
| 2006/0189303 | A1 * | 8/2006 | Rollender ..................... | 455/417 |
| 2007/0161377 | A1 * | 7/2007 | Patabandi et al. ............. | 455/450 |
| 2008/0261628 | A1 * | 10/2008 | Proctor et al. ................ | 455/458 |
| 2009/0305728 | A1 * | 12/2009 | Huang et al. .................. | 455/458 |

FOREIGN PATENT DOCUMENTS

| | | | |
|---|---|---|---|
| CN | 1296715 | A | 5/2001 |
| CN | 1902956 | A | 1/2007 |
| CN | 101605361 | A | 12/2009 |
| WO | 99/52317 | A2 | 10/1999 |
| WO | 2005/065203 | A2 | 7/2005 |

OTHER PUBLICATIONS

Office Action dated Sep. 29, 2013 for Chinese Patent Application No. 201010118648.0 (6 pages).

* cited by examiner

*Primary Examiner* — Nathan Mitchell
(74) *Attorney, Agent, or Firm* — Perkins Coie LLP

(57) ABSTRACT

Apparatuses, techniques, and systems for operating a mobile station with multiple subscriptions includes transmitting a paging message for a subscriber identity of two or more subscriber identities that are associated with a single mobile station over a wireless communication channel based on a paging cycle structure including multiple paging slots. The two or more subscriber identities can include a first subscriber identity and a second, different subscriber identity. Transmitting the paging message can include using, during a paging cycle based on the paging cycle structure, a single paging slot to transmit the paging message, where the single paging slot is associated with the two or more subscriber identities.

40 Claims, 11 Drawing Sheets

PAGING MECHANISMS FOR MOBILE STATIONS WITH MULTIPLE SUBSCRIPTIONS

CROSS REFERENCE TO RELATED APPLICATIONS

This application is a continuation of and claims priority to U.S. patent application Ser. No. 12/701,327, filed Feb. 5, 2010, which claims benefit of the priority of U.S. Provisional Application Ser. No. 61/150,256, filed Feb. 5, 2009. The entire contents of the before-mentioned patent applications are incorporated by reference as part of the disclosure of this application.

BACKGROUND

This document relates to wireless communication systems, apparatuses, and techniques.

Wireless communication systems and apparatuses use electromagnetic waves to communicate with fixed and mobile wireless communication devices such as mobile stations, e.g., mobile devices, mobile phones, fixed wireless devices, and laptop computers with wireless communication cards, that are located within coverage areas of the wireless communication systems to provide voice and data services to mobile users.

Various wireless communication systems can include a network of one or more base stations to communicate with one or more wireless devices such as a mobile device, cell phone, wireless card, mobile station (MS), user equipment (UE), access terminal (AT), or subscriber station (SS). A base station can be referred to as an access point (AP) or access network (AN) or can be included as part of an access network or a base station subsystem (BSS). Further, a wireless communication system can include one or more core networks to control one or more base stations. A wireless communication system can include one or more of: a base station (BS), base station controller (BSC), and a mobile switching center (MSC). A system can include one or more packet data serving nodes (PDSNs) to provide packet data services.

Wireless communication systems can use one or more wireless air link technologies to communicate. Various examples of wireless air link technologies include Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), evolved UTRAN (E-UTRAN), Long-Term Evolution (LTE), and Worldwide Interoperability for Microwave Access (WiMAX). Various examples of wireless technology standards bodies include 3GPP, 3GPP2, and IEEE 802.16.

A base station within a communication system can page a mobile station associated with a specific subscriber identity to setup a call such as a voice call. For example, an incoming call for a mobile station can generate a paging request message to alert the mobile station of the incoming call. A base station can send a paging request message over a paging channel on a specific paging slot determined by a mobile station's International Mobile Subscriber Identity (IMSI).

An identity module can store an identity of a subscriber of a wireless communication system. For example, an identity module can store a phone number assigned to a wireless phone or user. Various examples of an identity module include a Subscriber Identity Module (SIM) card and a Removable User Identity Module (RUIM) card. In some implementations, an identity module is a removable device that includes a non-volatile memory configured to store a mobile station's subscription information such as a subscriber identity, e.g., or a roaming list. A subscriber identity can include an IMSI.

SUMMARY

This document describes technologies, among other things, to operate mobile stations with multiple subscriptions.

In one aspect, techniques, apparatuses, and systems for operating a mobile station with multiple subscriptions can include associating first and second subscriber identities with a mobile station; paging the mobile station using the first subscriber identity to operate the mobile station to monitor a paging channel using the second identity; and paging the mobile station using the second identity.

In another aspect, techniques, apparatuses, and systems for operating a mobile station with multiple subscriptions can include associating first and second subscriber identities with a mobile station; associating a common value with both the first and second subscriber identities; and paging the mobile station over a paging channel at a paging slot determined by the common value to inform the mobile station of a page for either the first or second subscriber identity.

In yet another aspect, apparatuses, and systems for operating a mobile station with multiple subscriptions can include transmitting a paging message for a subscriber identity of two or more subscriber identities that are associated with a single mobile station over a wireless communication channel based on a paging cycle structure including multiple paging slots. The two or more subscriber identities can include a first subscriber identity and a second, different subscriber identity. Transmitting the paging message can include using, during a paging cycle based on the paging cycle structure, a single paging slot to transmit the paging message, where the single paging slot is associated with the two or more subscriber identities.

These and other implementations can include one or more of the following features. Transmitting the paging message can include paging the mobile station based on the first subscriber identity to operate the mobile station to monitor a paging slot that is determined by the second subscriber identity. Implementations can include paging the mobile station in the paging slot that is determined by the second subscriber identity.

Various implementations can operate the first and second subscriber identities in different paging modes, e.g., the first subscriber identities is operated in an active paging mode and the second subscriber identity is operated in a standby paging mode. Various implementations can operate the mobile station to send one or more signaling messages to enable the active paging mode for the first subscriber identity and the standby paging mode for the second subscriber identity. Implementations can include operating the mobile station to monitor a paging channel at a paging slot determined by a subscriber identity being operated in the active paging mode. Implementations can include operating the mobile station to use a hash function and an International Mobile Subscriber Identity (IMSI) of the subscriber identity being operated in the active paging mode to calculate a paging channel number and a paging slot number.

Transmitting the paging message can include operating a base station to page the mobile station for a subscriber identity operated in the standby paging mode via a subscriber identity operated in the active paging mode. Operating the base station to page the mobile station for the subscriber identity operated in the standby paging mode can include sending a first paging message to the mobile station based on the subscriber identity operated in the active paging mode to cause the subscriber identity operated in the standby paging mode to enter operations in the active paging mode. Implementations can include sending a second paging message, during a subsequent paging cycle, to inform the mobile station about a page for the subscriber identity that entered into operations in the active paging mode.

Various implementations can associate a common value with the first and second subscriber identities. Transmitting the paging message can include paging the mobile station based on the common value to inform the mobile station of a page for either the first or second subscriber identity. Implementations can include receiving, from a mobile station, one or more signaling messages that provide the common value. A signaling messages can include information that indicates an association between the common value and the first subscriber identity. A signaling messages can include information that indicates an association between the common value and the second subscriber identity. Associating the common value with the first and second subscriber identities include using the received one or more signaling messages.

Paging the mobile station based on the common value can include using a paging parameter determined based on a hash function and the common value to transmit a paging message. Various examples of paging parameters include a paging channel number, a paging slot number, a quick paging channel number, and a paging indicator position. A common value can be based on a unique equipment identifier associated with a mobile station. A common value can be based on a user identifier associated with the mobile station. A user identifier can include a user identity module identifier. Implementations can include operating a network node to maintain an association between the common value and a subscriber identity of the multiple subscriber identities.

In another aspect, wireless communication systems can include multiple base stations configured to transmit a paging message for a subscriber identity of two or more subscriber identities that are associated with a single mobile station over a wireless communication channel based on a paging cycle structure comprising multiple paging slots. The two or more subscriber identities can include a first subscriber identity and a second, different subscriber identity. The base stations can be configured to use, during a paging cycle based on the paging cycle structure, a single paging slot to transmit the paging message, where the single paging slot is associated with the two or more subscriber identities.

In another aspect, wireless communication apparatuses and systems can include a first mechanism configured to receive a paging message for a subscriber identity of two or more subscriber identities that are associated with a single mobile station over a wireless communication channel based on a paging cycle structure comprising multiple paging slots. The two or more subscriber identities can include a first subscriber identity and a second, different subscriber identity. The first mechanism can be configured to monitor, during a paging cycle based on the paging cycle structure, a paging slot to receive the paging message. The paging slot can be associated with the two or more subscriber identities. Apparatuses and systems can include a second mechanism, in communication with the first mechanism, configured to determine a paging slot number associated with the paging slot.

These and other implementations can include one or more of the following features. Implementations can include a mechanism to operate the first and second subscriber identities in different paging modes. For example, the first subscriber identities is operated in an active paging mode and the second subscriber identity is operated in a standby paging mode. Implementations can include a mechanism to send one or more signaling messages to enable the active paging mode for the first subscriber identity and the standby paging mode for the second subscriber identity. Implementations can include a mechanism to monitor a paging channel at a paging slot determined by a subscriber identity being operated in the active paging mode. Implementations can include a mechanism to use a hash function and an International Mobile Subscriber Identity (IMSI) of the subscriber identity being operated in the active paging mode to calculate a paging channel number and a paging slot number.

In some implementations, the first mechanism is configured to receive a page for a subscriber identity operated in the standby paging mode via a subscriber identity operated in the active paging mode. In some implementations, the first mechanism is configured to receive a first paging message based on the subscriber identity operated in the active paging mode that causes the subscriber identity operated in the standby paging mode to enter operations in the active paging mode. In some implementations, the first mechanism is configured to receive a second paging message, during a subsequent paging cycle, that includes a page for the subscriber identity that entered into operations in the active paging mode.

Implementations can include a mechanism to associate a common value with the first and second subscriber identities, wherein the paging slot number is based on the common value. Implementations can include a mechanism to determine paging parameters based on the common value, wherein the paging parameter include one or more of: a paging channel number, a paging slot number, a quick paging channel number, or a paging indicator position. A common value can be based on a unique equipment identifier. A common value can be based on a user identifier associated with the mobile station. A user identifier can include a user identity module identifier. Implementations can include a mechanism to send one or more signaling messages that provide the common value, wherein the one or more signaling messages comprise information that indicates an association between the common value and the first subscriber identity and information that indicates an association between the common value and the second subscriber identity. Implementations can include a mechanism to determine a paging slot number based on a common value that is associated with the two or more subscriber identities. Implementations can include a mechanism to monitor for paging messages for any of the two or more subscriber identities based on the paging slot number.

Particular implementations of the subject matter described in this document can be implemented to realize one or more of the following potential advantages. Technologies such as standby paging techniques can increase a mobile station's battery life by placing one or more subscriptions on a standby paging mode; can be implemented in an application messaging layer, e.g., using a Short Message Service (SMS) between a mobile station and a network node without changing existing specifications; can scale to more than two service subscriptions, e.g., more than two identity modules; can permit backwards compatibility with legacy mobile stations. Technologies such as common hash key techniques can increase a mobile station's battery life by sharing the common hash key among multiple subscriber identities so that no additional wakeup time is necessary; can permit backwards compatibility with legacy mobile stations; can scale to more than two service subscriptions, e.g., more than two identity modules; and may have minimal or no impact on paging latency.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
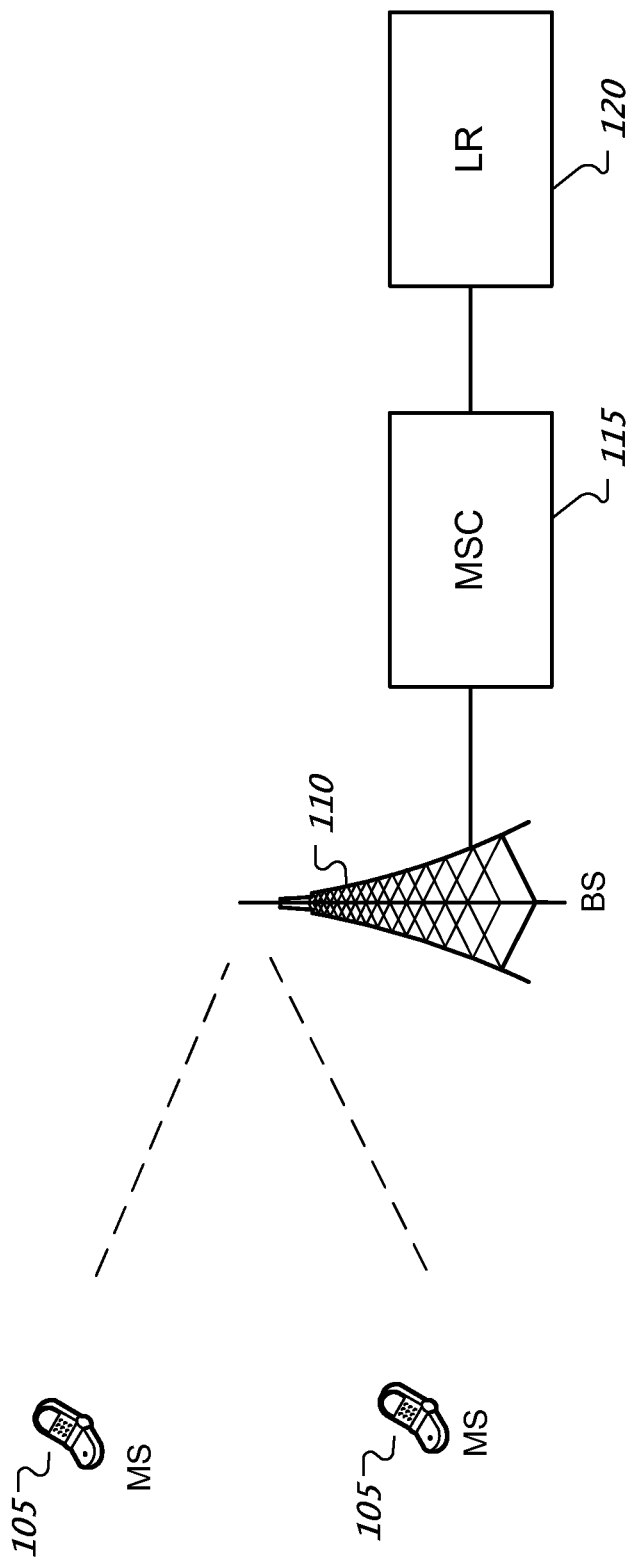
FIG. 1 shows an example of a wireless communication system.

FIG. 1 shows an example of a wireless communication system. A wireless communication system can include one or more network nodes such as a base station (BS) 110, Mobile Switching Center (MSC) 115, and Location Register (LR) 120 such as a Home Location Register (HLR) or Visitor Location Register (VLR). The BS 110 can communicate with one or more mobile stations (MSs) 105. Different implementations based on technologies described herein can use different wireless communication network implementations and communication protocols. A base station 110 can page a mobile station 105 associated with a subscriber identity to establish communications under that subscriber identity. For example, an incoming call for a mobile station 105 can generate a paging request message to alert the mobile station 105 of the incoming call.

A MS 105 can include an identity module to control the MS 105 to operate based on a wireless subscription identity stored in the identity module. In some implementations, an identity module is integrated into the MS. In some implementations, the MS 105 includes a card slot usable to insert or remove an identity module card.

A mobile station can have multiple card slots for multiple identity modules to operate based on multiple subscription identities, respectively. A mobile user may use this type of mobile phone to subscribe to multiple mobile services from one or more wireless network operators. For example, a mobile user may use a first subscription for business usage and simultaneously use a second subscription for personal usage without switching cards.

Figure 2:
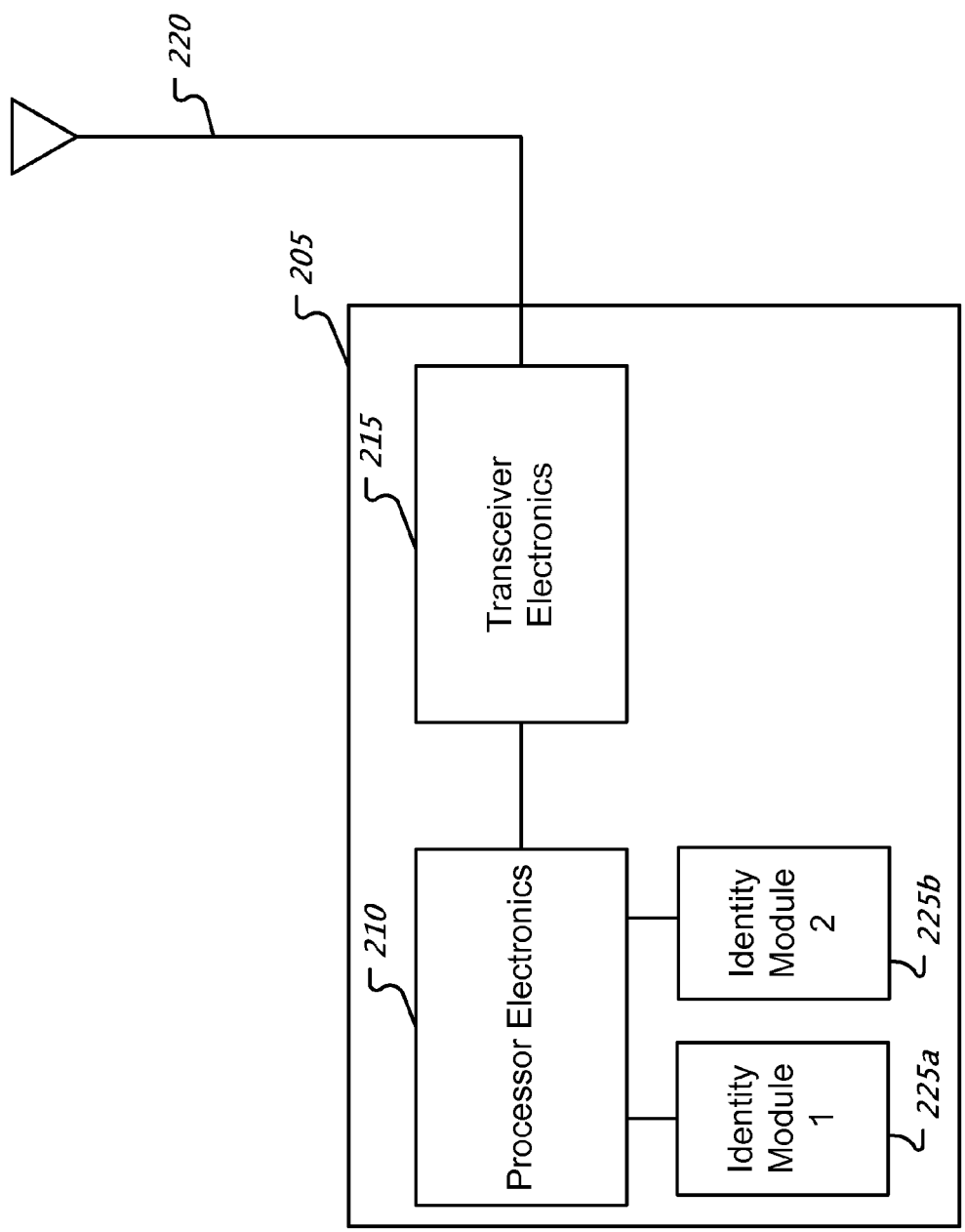
FIG. 2 shows an example of a mobile station architecture with multiple identity modules.

FIG. 2 shows an example of a mobile station architecture with multiple identity modules. A mobile station 205 can include processor electronics 210 such as a microprocessor that implements methods such as one or more of the wireless communication techniques presented in this patent application. A mobile station 205 can include transceiver electronics 215 to send and/or receive wireless signals over a communication air interface such as an antenna 220. A mobile station 205 can include other communication interfaces for transmitting and receiving data.

A mobile station 205 can include multiple identity modules 225a, 225b. Various examples of identity modules include a Subscriber Identity Module (SIM) card and a Removable User Identity Module (R-UIM) card. An identity module can store subscription information such as an International Mobile Subscriber Identity (IMSI). In some implementations, an identity module can store data such as a roaming list, an address book, or user data. In some implementations, an identity module is an independent device from a mobile station. In some implementations, identity modules are managed and controlled by wireless network operators. In some implementations, a mobile station includes an identity module for a service subscription. A subscription can be associated with a subscriber identity such as phone number, e.g., IMSI.

Wireless users may subscribe to multiple services on a single mobile device. For example, a wireless user may use multiple subscriptions on a single mobile phone, e.g., one subscription and phone number for business and a different subscription and phone number for personal. Each subscription can have a separate wireless service plan.

A mobile station with multiple identity modules can support a radio mode such as single radio modes, e.g., CDMA or GSM, or dual radio modes, e.g., CDMA with GSM/WCDMA/HSPA. Regardless of whether a mobile station uses a single or dual radio technologies, a mobile station having multiple subscriptions can operate using a single subscription or multiple subscriptions operation simultaneously. For example, a mobile station having multiple subscriptions can select any subscribed phone number to make a call, and can receive a page message for any subscribed phone number.

However, when a mobile station operates in simultaneous operation using multiple subscriptions, the following issues may arise. Various wireless communication protocols specify a sleep mode. In a sleep mode, a mobile station can turn off one or more of the mobile station's transmitter, receiver, and processor to conserve battery life. During an idle stage, a mobile station can periodically wake up from the sleep mode to monitor one or more wireless communication channels such as a paging or control channel for receiving information from a base station.

Simultaneous operation of a mobile station using multiple subscriptions may increase the drain on a mobile station's battery. For example, a mobile station with multiple subscriptions that monitors two paging slots for two subscriptions, respectively, may place more demand on a battery than monitoring one paging slot for one subscription.

A mobile station can apply a hashing function to a value such as an IMSI to determine one or more paging parameters. Various examples of paging parameters include a paging channel number, a paging slot number, a quick paging channel number, and a paging indicator position. The mobile stations can use the one or more paging parameters to monitor a paging channel in an idle stage. In some implementations, a mobile station can use discontinuous reception (DRX) to monitor a paging channel.

A mobile station with dual subscriptions and dual IMSIs, e.g., IMSI 1 and IMSI 2 can produce different hashing function output values. For example, two IMSIs may result in hashing to two different paging channel numbers, two different quick paging channel numbers, two different paging slots to be monitored, or two different paging indicator positions. To receive paging messages for IMSI 1 and IMSI 2, a mobile station with dual subscriptions can be required to monitor two paging slots in one or more paging channels hashed from IMSI 1 and IMSI 2. This may cause the mobile station to doubly drain the mobile station's battery in an idle stage.

Figure 3:
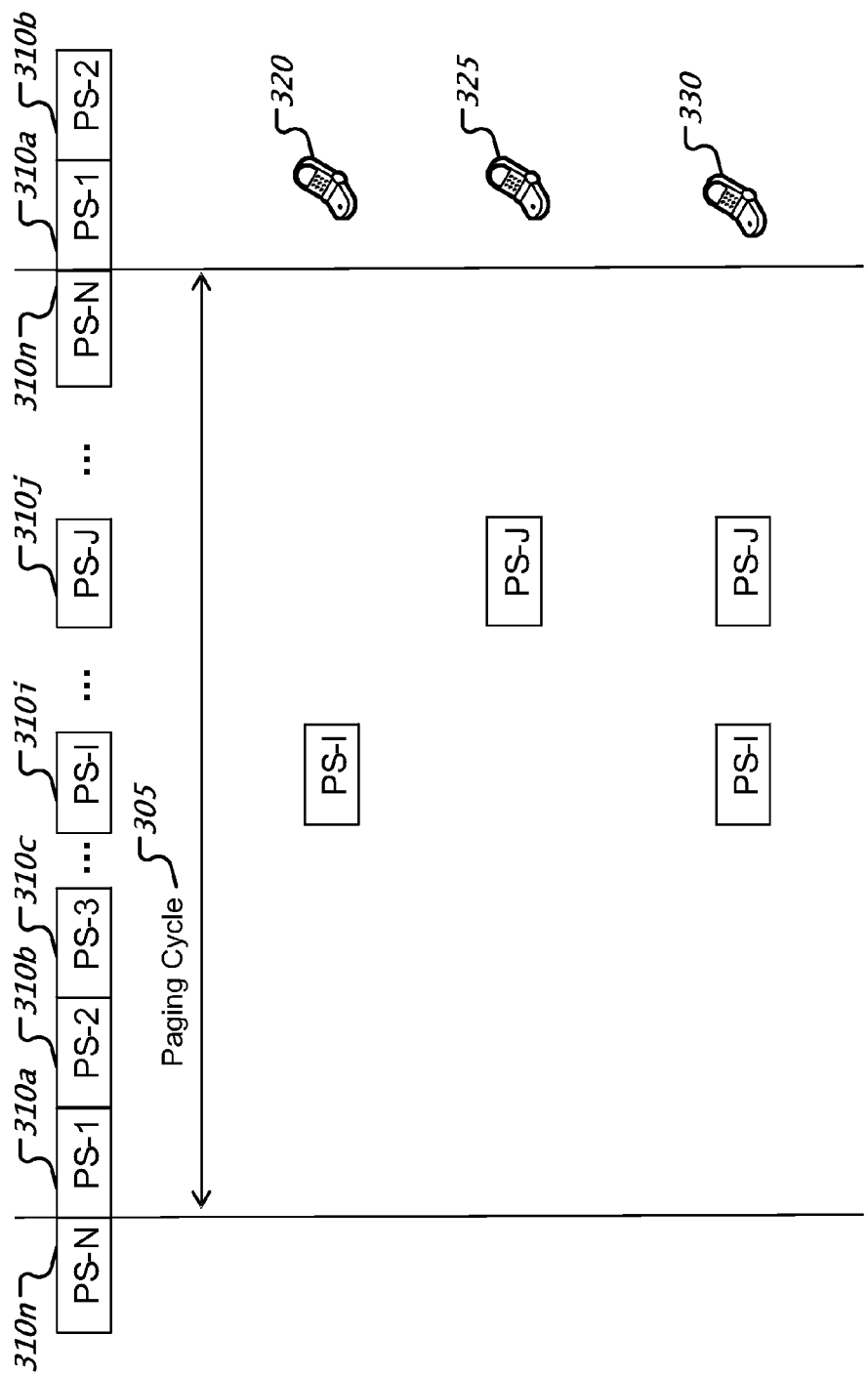
FIG. 3 shows different examples of paging scenarios for mobile stations.

FIG. 3 shows different examples of paging scenarios for mobile stations. A paging cycle structure can include multiple paging slots that repeat over different paging cycles 305. In this example, a paging cycle 305 is divided into N paging slots in a time domain, e.g. see paging slots PS-1, PS-2, PS-I, PS-J, PS-N, respectively, paging slots 310*a*, 310*b*, 310*c*, 310*i*, 310*j*, 310*n*. Radio stations such as mobile stations and base stations can determine a specific paging slot for an IMSI, e.g., computing a hash of an IMSI.

In this example, a MS 320 whose IMSI hashes to PS-I can wake up to monitor for a paging message such as a paging message at PS-I. Another MS 325, in this example, whose IMSI hashes to paging slot PS-J wakes up to monitor for a paging message at paging slot PS-J. Another MS 330 has multiple subscriptions associated with multiple IMSIs, e.g., IMSI 1 and IMSI 2, that respectively map to different paging slots, e.g., a first paging slot PS-I 310*i* associated with IMSI 1 and a second paging slot PS-J 310*j* associated with IMSI 2. Some wireless communication systems may require that a mobile station with multiple subscriptions wake up at multiple different times during a paging cycle 305, e.g., wake up at multiple paging slots PS-I and PS-J during a single paging cycle. Waking up at multiple paging slots during a single paging cycle may result in the mobile station draining its battery faster than a mobile station that only wakes up at a single paging slot during a single paging cycle.

This document describes, among other things, technologies to operate mobile station with multiple subscriptions. The described technologies can increase a paging wake-up efficiency of a mobile station with multiple subscriptions. Increasing the paging wake-up efficiency can increase the mobile station's battery life. For example, based on the technology described herein, the battery life of a mobile station with multiple subscriptions can be comparable to that of a mobile station with a single subscription. Technologies described herein include standby paging and common hash key paging mechanisms.

A standby paging mechanism can place one or more subscriptions of a mobile station with multiple subscriptions into a standby paging mode and operation one of the subscriptions in an active paging mode. A wireless communication system can use an identity of the subscription placed in the active paging mode to reach the mobile regarding an incoming call for a subscription placed in the standby paging mode.

For example, in a mobile terminated call, a mobile station with multiple subscriptions only monitors the paging channel and paging slot for the active paging mode subscription identity. If there is an incoming call from the network for the standby paging identity, the network can send an paging message to the mobile station to trigger entry into an active paging mode of a subscription that is placed in the standby paging mode. After the mobile station is in the active paging mode for the subscriber identity associated with the received paging message, the base station can send a page message for the subscriber identity to establish the incoming call with the mobile station.

A mobile station configured with multiple identity modules having respective subscription identities can assign one of the respective subscription identities, e.g., IMSI 1 to active paging and assign a different subscription identity, e.g. IMSI 2, to standby paging. The module mobile station can use a hash function with an input of IMSI 1 to determine one or more paging parameters such as a paging channel number, quick paging channel number, paging slot number, or paging indicator positions. The mobile station can monitor for paging messages based on an output of the hash function. In some implementations, to page the mobile station on IMSI 1, a MSC can send a page message to the mobile station directly over the paging channel and slot determined by the hashing function output based on IMSI 1.

A mobile station with multiple subscription identities can register each identity with a wireless communication system. In some implementations, the registered subscription identities are initially operated in an active paging mode. Active paging operations can include monitoring a paging channel and a paging slot associated for each of the registered subscription identities that are in an active paging mode.

Based on a successful completion of one or more subscription identity registrations, the mobile station can send a message such as a Standby Paging Request message to a network node such as a MSC, VLR, or HLR to indicate that the mobile station is requesting to enter a standby paging mode for at least one of the subscription identities. In some implementations, a Standby Paging Request message can include an IMSI to identify a specific one of the multiple subscription identities for the standby paging mode request.

Based on receiving a Standby Paging Request message, a MSC can send a Standby Paging Response to the mobile station to signal a confirmation of standby paging. If the mobile station does not receive a Standby Paging Response message in a specified time period, the mobile station can re-send the Standby Paging Request message to the MSC.

The mobile station, based on receiving a Standby Paging Response message, can place the subscription identity associated with the request and response messages in a standby paging mode. Standby paging does not require the mobile station to monitor the paging channel and slot determined by the subscription identity that is placed in a standby paging mode. For example, a mobile station is not required to wake up at a paging slot specified by a hashing function using the IMSI that is placed in a standby paging mode. Instead, the mobile station with multiple subscriptions can monitor the paging channel and slot determined by an IMSI in the active paging mode.

Messages such as Standby Paging Request messages or Standby Paging Response messages can be implemented as a L3 message defined in wireless specification such as one from 3GPP or 3GPP2. In some implementations, messages such as Standby Paging Request messages or Standby Paging Response messages can be encapsulated in SMS format as an application message.

A standby paging mechanism can be used for multiple subscriptions assigned from one or more wireless network operators. For example, a mobile station's first and second subscriptions are from the same wireless network operator. In another example, a mobile station's first and second subscriptions are from first and second wireless network operators, respectively. Moreover, the first and second wireless network operators can operate using different wireless technology, e.g., CDMA for one and GSM or WCDMA for the other.

Figure 4:
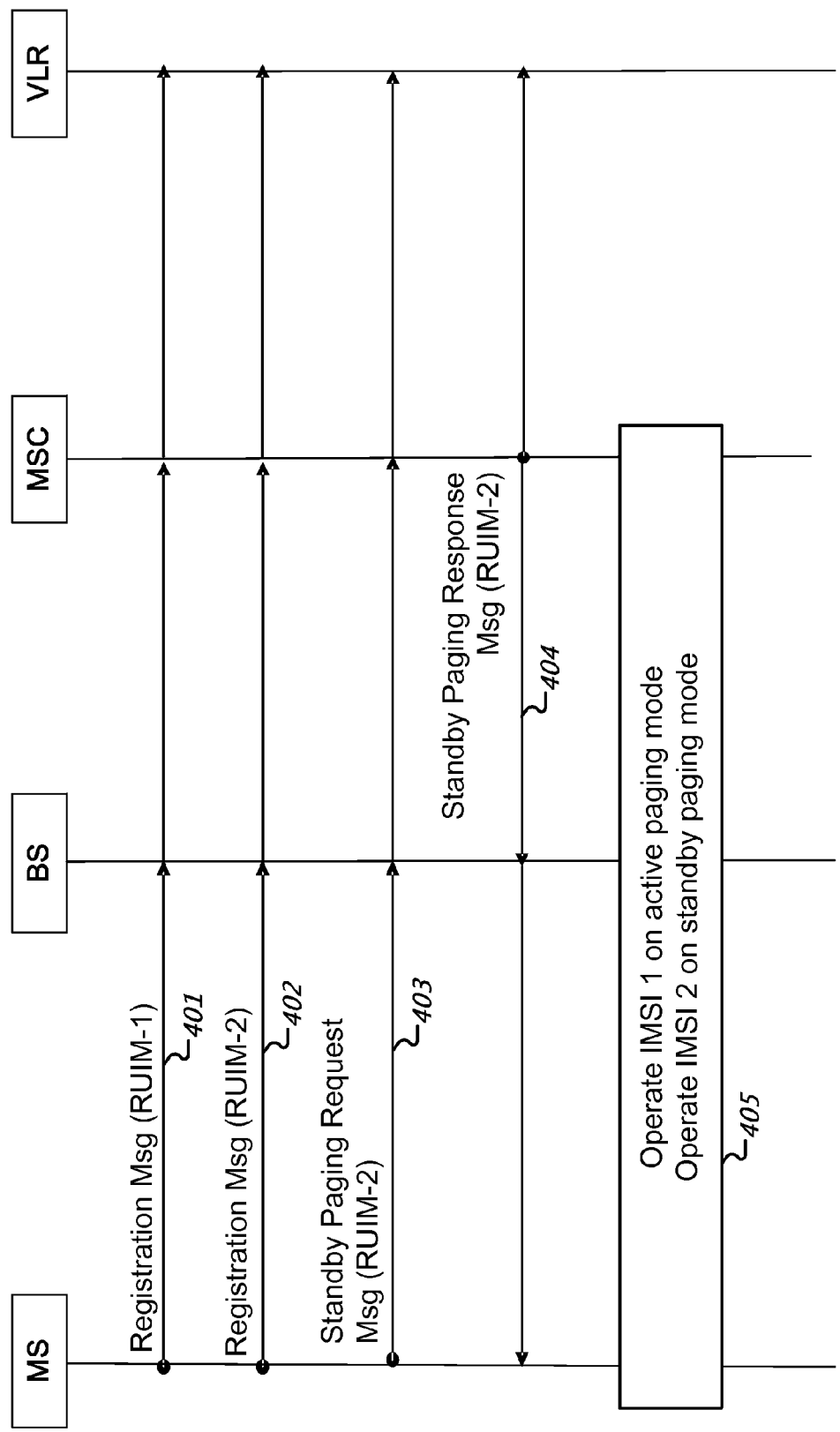
FIG. 4 shows an example of a setup process for standby paging.

FIG. 4 shows an example of a setup process for standby paging. In this example, a MS is operated with first and second identity modules, e.g., RUIM-1 and RUIM-2, that store first and second subscription identities, e.g., IMSI 1 and IMSI 2. At 401, a MS sends a registration message for a subscription in RUIM-1. At 402, the MS sends a registration message for a subscription in RUIM-2. At 403, the MS sends a Standby Paging Request message to request IMSI 2 to be in a standby paging mode. At 404, the MSC sends a Standby Paging Response message to acknowledge standby paging for IMSI 2. At 405, the MS, BS, and MSC operate IMSI 1 on the active paging mode and operates IMSI 2 on the standby paging mode. In some implementations, operating IMSI 1 on the active paging mode includes monitoring a paging channel and slot hashed from IMSI 1.

A wireless communication system can page a mobile station with multiple subscriber identities. A dual subscription mobile station can monitor a specific paging channel determined by a first subscriber identity, e.g., IMSI 1, while maintaining a second subscriber identity, e.g., IMSI 2, in a standby paging mode. In some implementations, a wireless communication system can page the mobile station based on the first subscriber identity to operate the mobile station to monitor a paging channel based on the second identity. The system can page the mobile station over a paging channel based on the second identity.

When a wireless communication system is required to page the mobile station for IMSI 2, a MSC can send a paging message such as a Standby Paging Indication (SPI) message to the mobile station over a paging channel and slot specified by a hashing function output using IMSI 1. In some implementations, a SPI message can be a L3 message defined in 3GPP or 3GPP2. In some implementations, a SPI message can be encapsulated in a SMS format as an application message.

If a mobile station receives a SPI message on the paging channel and slot specified by the hashing function using IMSI 1, the mobile station can operate IMSI 2 in an active paging mode in a subsequent paging cycle. For example, based on the SPI message, the mobile station switches from monitoring a paging slot determined by IMSI 1 to a paging slot determined by IMSI 2. In some implementations, instead of switching, the mobile station monitors the paging slot determined by IMSI 1 and the paging slot determined by IMSI 2.

The MSC pages the mobile station for IMSI 2 over the paging channel and slot determined by a hashing function using IMSI 2. When the mobile station receive a paging message on IMSI 2, the mobile station can send a paging response message and performs call processing to set up a traffic channel for the mobile terminated call.

After the mobile station completes the call on IMSI 2, the mobile station can send a Standby Paging Request (SPR) to the MSC to request to enter the standby paging mode for IMSI 2. Based on receiving a SPR, the MSC can send a Standby Paging Response message to the mobile station over a paging channel determined by the hashing function using IMSI 2. Based on receiving a Standby Paging Response message, the mobile station can place IMSI 2 in the standby paging mode and is not required to monitor the paging channel and slot specified by the hashing function using IMSI 2.

Figure 5:
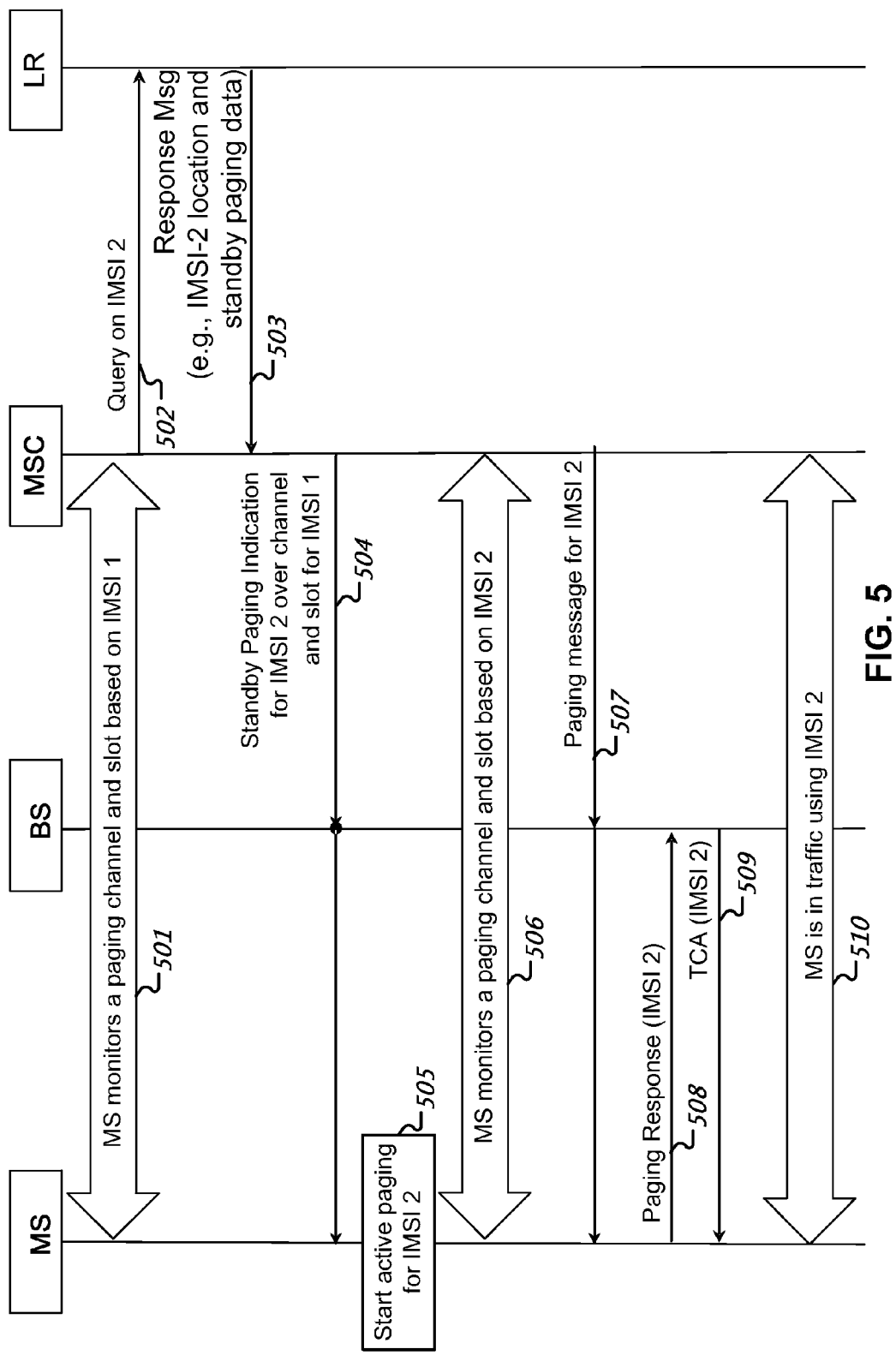
FIG. 5 shows an example of a paging process for standby paging.

FIG. 5 shows an example of a paging process for standby paging. In this example, a dual subscription MS operates IMSI 1 in an active paging mode and IMSI 2 in a standby paging mode. At 501, the MS monitors a paging channel and slot based on IMSI 1.

Based on an event such as receiving an incoming call for IMSI 2, the MSC locates IMSI 2. At 502, the MSC sends a query to a location register (LR), e.g., a HLR or VLR, to locate IMSI 2. At 503, the LR sends a response message. The response message can include a location of IMSI 2, e.g., an identifier of a BS serving the MS, and associated standby paging information.

At 504, the MSC sends a Standby Paging Indication message for IMSI 2 over the paging channel and slot hashed from IMSI 1. At 505, the MS Starts active paging for IMSI 2. At 506, the MS monitors a paging channel and slot based on IMSI 2. In some implementations, at 506, the MS monitors the paging channels and slots for IMSI 1 and IMSI 2, respectively. At 507, the MSC sends a paging message for IMSI 2 over the paging channel and slot based on IMSI 2. At 508, the MS sends a paging response message for IMSI 2. At 509, the BS sends a Traffic Channel Assignment (TCA) message for IMSI 2. At 510, the MS is in traffic using IMSI 2.

Figure 6:
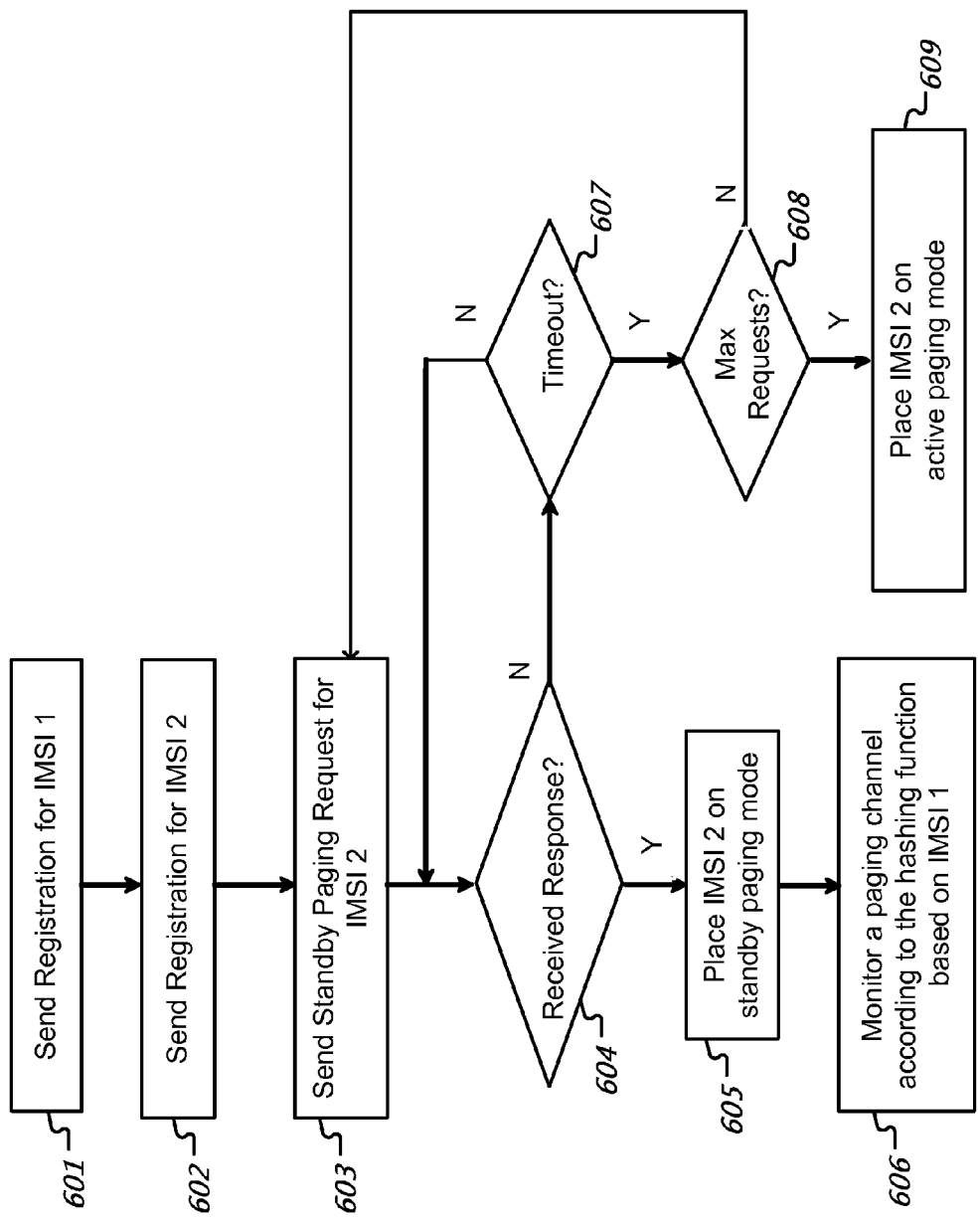
FIG. 6 shows an example of a process for standby paging in a mobile station.

FIG. 6 shows an example of a process for standby paging in a mobile station. In this example, a MS is operated with an identity module associated with IMSI 1 and an identity module associated with IMSI 2. At 601, the MS sends a registration for IMSI 1. At 602, the MS sends a registration for IMSI 2. In some implementations, a MS can send a single registration message for multiple IMSIs. At 603, the MS sends a standby paging request for IMSI 2 and waits for a standby paging response.

At 604, if the MS has received a standby paging response, then, at 605, the MS places IMSI 2 on a standby paging mode. At 606, the MS monitors the paging channel according to the hashing function based on IMSI 1.

At 604, if the MS has not received a standby paging response, then, at 607, the MS determines whether a timer has expired for receiving a standby paging response. If the timer has not expired, the MS continues to wait for a response. If the timer has expired, then, at 608, the MS determines whether a maximum number of Standby paging responses have been sent. If a maximum number has not been reached, the MS, at 603, sends an additional standby paging request for IMSI 2. If the maximum number has been reached, the MS, at 609, places IMSI 2 on an active paging mode.

A wireless communication system can determine paging parameters based on a common value associated with a mobile station's multiple subscription identities. A Common Hash Key (CHK) paging mechanism can use a common value for the mobile station's multiple subscriber identities to calculate one or more paging parameters such as a paging channel number and a paging slot number. For example, based on assigning all of a mobile station's subscription identities to a common value, a mobile station can monitor the same paging channel number, paging slot, and paging indicator position for all of the mobile station subscriptions.

A common value such as a CHK can be used by a mobile station and a base station to determine paging parameters. In some implementations, a CHK is used as an input to a hash function to determine a paging slot number. In some implementations, a CHK is based on an equipment identifier of a mobile station. Various examples of equipment identifiers include an Electronic Serial Number (ESN), Electronic Serial Number for Mobile Equipment (ESN_ME), Mobile Equipment Identifier (MEID), and Mobile Equipment Identifier for Mobile Equipment (MEID_ME). For example, the 32 least significant bits of a MEID_ME can be used as a CHK. In some implementations, a CHK is based on a user identifier such as a User Identity Module Identifier (UIM_ID), Extended User Identity Module identifier (EXT_UIM_ID), or IMSI. In some implementations, one of a mobile station's multiple IMSIs can be selected as a CHK. In some implementations, a CHK is based on a value controlled by a wireless service operator.

In some implementations, a mobile station can select a CHK value. The mobile station can send a selected CHK in a Common Hash Key Request message to a MSC to associate a subscription identity with the CHK. A mobile station can perform a registration procedure to register a subscription identity with the CHK based on detecting an identity module, e.g., detecting that a RUIM or SIM card has been inserted into the mobile station. A CHK Request message can be a L3 message defined in 3GPP or 3GPP2. In some implementations, a CHK request message is encapsulated in a SMS format as an application message.

Based on receiving a Common Hash Key Request message, a network component such as a MSC, VLR, or HLR can store the IMSI associated with CHK, and then can send a Common Hash Key Response message back to the mobile station. The CHK Response message can be a L3 message defined in 3GPP or 3GPP2, or encapsulated in SMS format as an application message. When receiving the Common Hash Key Response message, the mobile station can use the CHK as a hash key for a hash function. When the mobile station enters the idle state, the mobile station can monitor the paging channel and slot determined by the hash function using CHK.

If the mobile station does not receive a Common Hash Key Response message for a specified period after sending a Common Hash Key Request message, the mobile station can re-send a Common Hash Key Request message to the MSC. In some implementations, the mobile station is not required to use CHK as a hash key for a hash function if the mobile station does not receive the Common Hash Key Response message after a number of re-trials of sending the Common Hash Key Request.

In some implementations, a mobile station can send a Common Hash Key Complete message to MSC to confirm the that the CHK is enabled after receiving the Common Hash Key Response message. The CHK Complete message can be a L3 message defined in 3GPP or 3GPP2, or encapsulated in SMS format as an application message.

Figure 7:
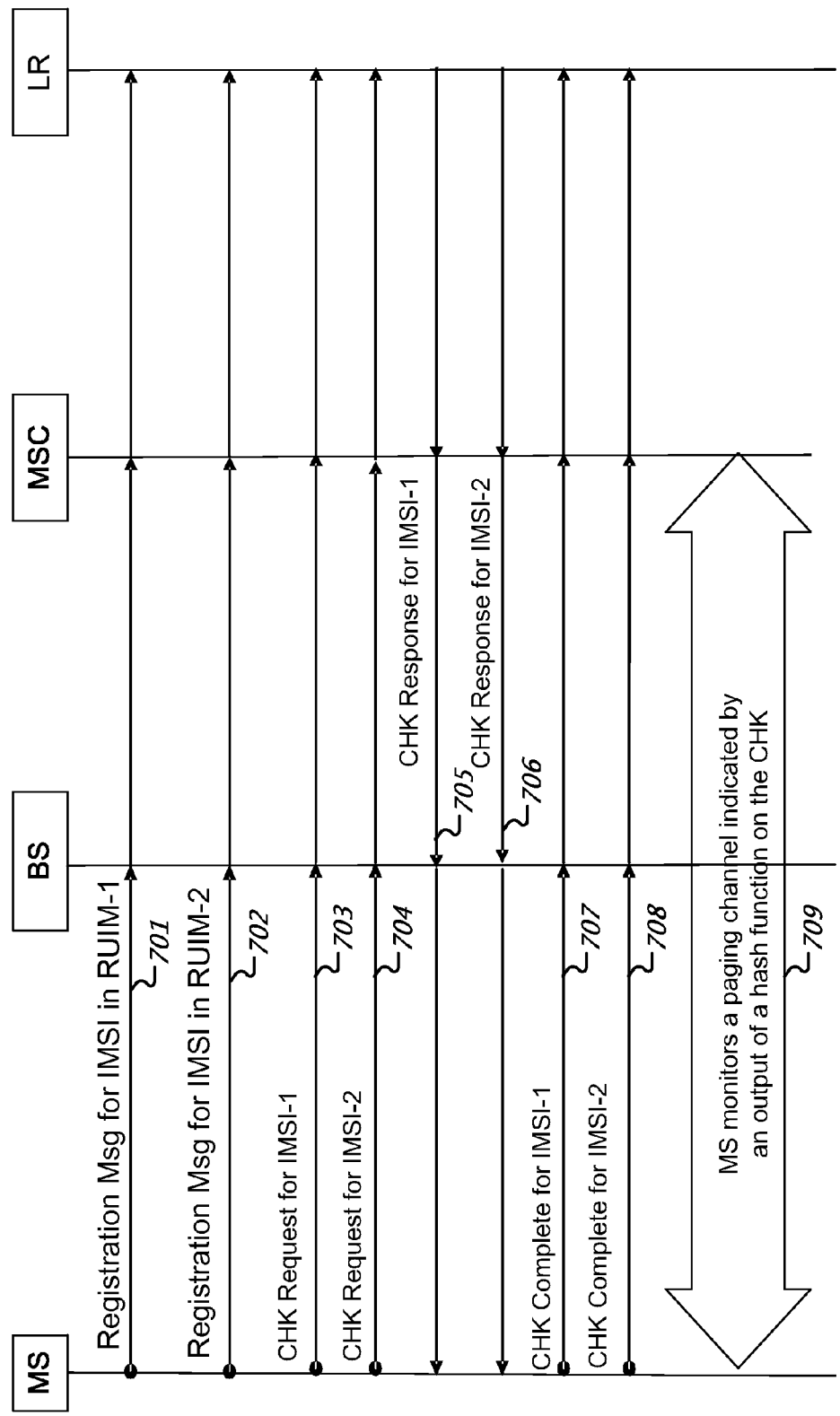
FIG. 7 shows an example of a setup process for a common hash key.

FIG. 7 shows an example of a setup process for a common hash key. A MS determines a presence of first and second RUIM cards, e.g., RUIM-1 and RUIM-2. The MS initiates a registration procedure to register the IMSIs in respective RUIM cards and to register a CHK. At 701, the MS sends a registration message for a subscription in RUIM-1. At 702, the MS sends a registration message for a subscription in RUIM-2. At 703, the MS sends a CHK request message for IMSI-1. At 704, the MS sends a CHK request message for IMSI-1. At 705, the MSC sends a CHK response message for IMSI-1. At 706, the MSC sends a CHK response message for IMSI-2. At 707, the MS sends a CHK complete message for IMSI-1. At 708, the MS sends a CHK complete message for IMSI-2. In some implementations, CHK complete messages are not required. At 709, the MS monitors a paging channel indicated by an output of a hash function on the CHK.

A wireless communication system can processes calls associated with different subscription identities. For example, a system can receive an incoming call associated with a specific phone number, e.g., IMSI 2. An incoming call can trigger a paging process for an associated mobile station. For example, a MSC can page a mobile station associated with IMSI 2. The MSC can query a Location Register to retrieve information such as the mobile station's location and CHK associated with IMSI 2. The MSC can send a paging request, such as an Extended Paging Request (EPR), to a base station to page the mobile station. An EPR message can include a mobile identifier, e.g., IMSI 2, and a value for a hash function, such as a CHK.

Based on receiving an EPR, from the MSC, the base station can use the CHK as a hash key input to a hashing function to determine paging parameters for the mobile station registered with IMSI 2. In some implementations, the BS sends a page message to the mobile station over a paging channel, slot, and paging indicator position determined from a hash function and the CHK. The mobile station can monitor a paging channel, paging slot and paging indicator position specified by the hash function using the same CHK to detect paging messages. If the mobile station receives a page message, the mobile station can send a page response to the base station. The mobile station and base station can follow a call control procedure to establish a traffic channel connection for the mobile terminated call.

Figure 8:
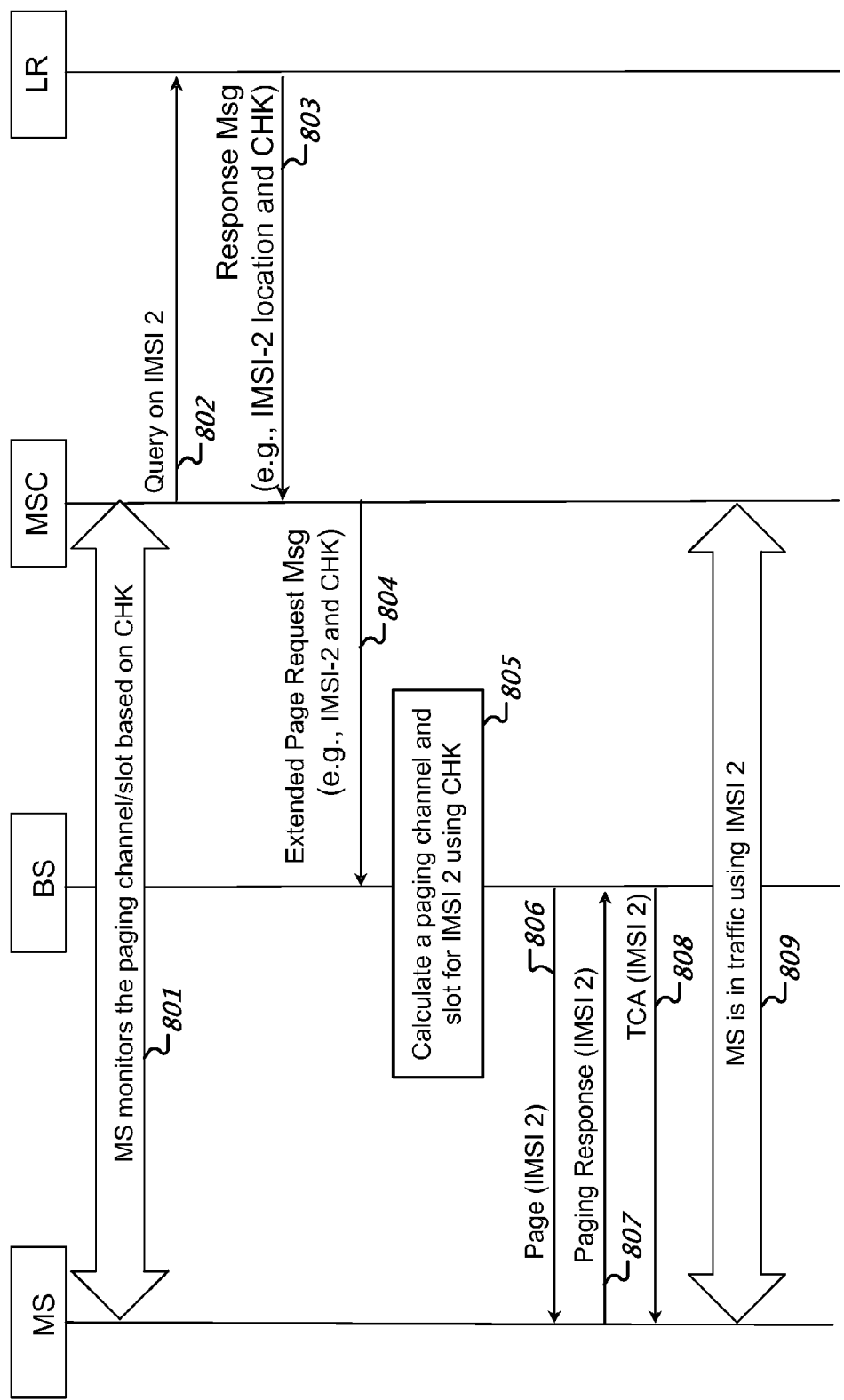
FIG. 8 shows an example of a paging process using a common hash key.

FIG. 8 shows an example of a paging process using a common hash key. At 801, a MS monitors a paging channel and a paging slot based on a common value such as a CHK. The MS is associated with multiple IMSIs, including IMSI 1 and IMSI 2, and the multiple IMSIs are associated with a CHK. Based on an event such as receiving an incoming call for IMSI 2, a MSC locates IMSI 2. For example, at 802, the MSC sends a query to a LR, e.g., a HLR or VLR, to locate IMSI 2. At 803, the LR sends a response message. The response message can include a location of IMSI 2, e.g., an identifier of a BS serving the MS, and associated CHK. At 804, the MSC sends an Extended Page Request message to a BS indicated by the response message. The Extended Page Request message can include information such as IMSI 2 and the CHK. At 805, the BS calculates a paging channel and slot for IMSI 2 using the CHK. At 806, the BS pages the MS for IMSI 2. At 807, the MS sends a paging response to the BS. At 808, the BS sends a TCA for IMSI 2 to the MS. At 809, the MS is in traffic using IMSI 2.

In some implementations, a common hash key registration procedure can associate a CHK with a specific mobile station and one or more IMSIs. A CHK can be based on an unique equipment identifier such as a MEID_ME. A wireless communication system can broadcast information to indicate that equipment identifier based hash keys are supported. For example, a base station can broadcast a MEID_ME_Hash_Key indicator in a broadcast message such as a System Parameter Message (SPM). In some implementations, a SPM with a MEID_ME_Hash_Key of 1 indicates that a wireless network supports MEID_ME based hash keys. Such a SPM can control a mobile station to use a MEID_ME based hash key to calculate one or more paging parameters.

In some implementations, during a registration procedure, a base station can send a Status Request message to request a mobile station's MEID_ME information. Based on receiving the request from the base station, the mobile station can send a response message, e.g., a Status Response or Extended Status Response message, that includes a MEID_ME. Based on receiving a Status Response message, a network node such as a base station or a base station controller can send a Location Updating Request to a MSC with the mobile station's MEID_ME.

A MSC can assign a mobile station's MEID_ME as the CHK for the mobile station. The MSC can communicate the CHK to a location register associated with the mobile station's IMSI. The MSC can send a Location Update Accepted message to the base station that originated the Status Request message. The base station sends a Registration Accepted Order to the mobile station after receiving Location Update Accepted message. The mobile station can repeat this registration procedure for an additional subscription(s) such as a second IMSI, and the base station and MSC can follow a registration procedure to associate the second IMSI with the mobile station's CHK. When entering an idle state, the mobile station can monitor the paging channel and slot specified by a hash function based on using mobile station's MEID_ME as the hash key.

In some implementations, a SPM with a MEID_ME_Hash_Key of 0 indicates that a wireless network does not support MEID_ME based hash keys. Such a SPM can control a mobile station to use an IMSI based hash key to calculate the paging channel and slot. In some implementations, the network can use IMSI based hash key to calculate the paging channel and slots, and page the mobile stations. In some implementations, mobile stations that operate in a legacy mode, e.g., no simultaneous subscriptions operations, can disregard the MEID_ME_Hash_key value and use IMSI based hash keys.

Figure 9:
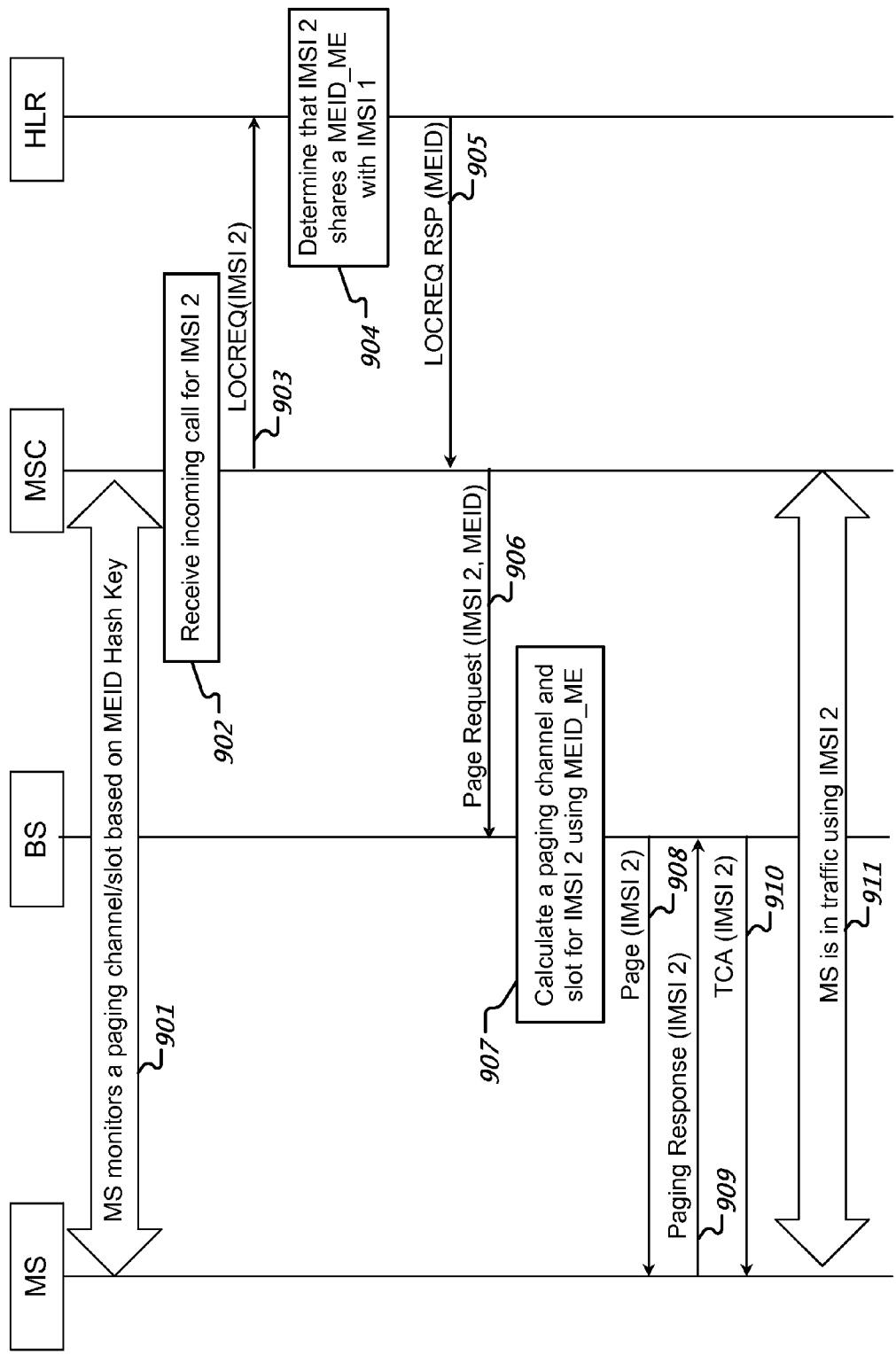
FIG. 9 shows an example of intra-MSC paging using a MEID based common hash key.

FIG. 9 shows an example of intra-MSC paging using a MEID based common hash key. In this example, a MS is associated with multiple IMSIs, including IMSI 1 and IMSI 2. At 901, a MS monitors a paging channel/slot based on a MEID Hash Key. At 902, there is an incoming call for IMSI 2. At 903, the MSC sends a location request message, e.g., LOCREQ, including IMSI 2 to the HLR. At 904, the HLR determines that IMSI 2 shares a MEID_ME with IMSI 1. At 905, the HLR sends a LOCREQ response with MEID. At 906, the MSC sends a Page Request including IMSI 2 and the MEID. At 907, the BS calculates a paging channel and slot for IMSI 2 using MEID_ME. At 908, the BS pages the MS for IMSI 2. At 909, the MS sends a paging response to the BSS. At 910, the BS sends a TCA for IMSI 2 to the MS. At 911, the MS is in traffic using IMSI 2.

Figure 10:
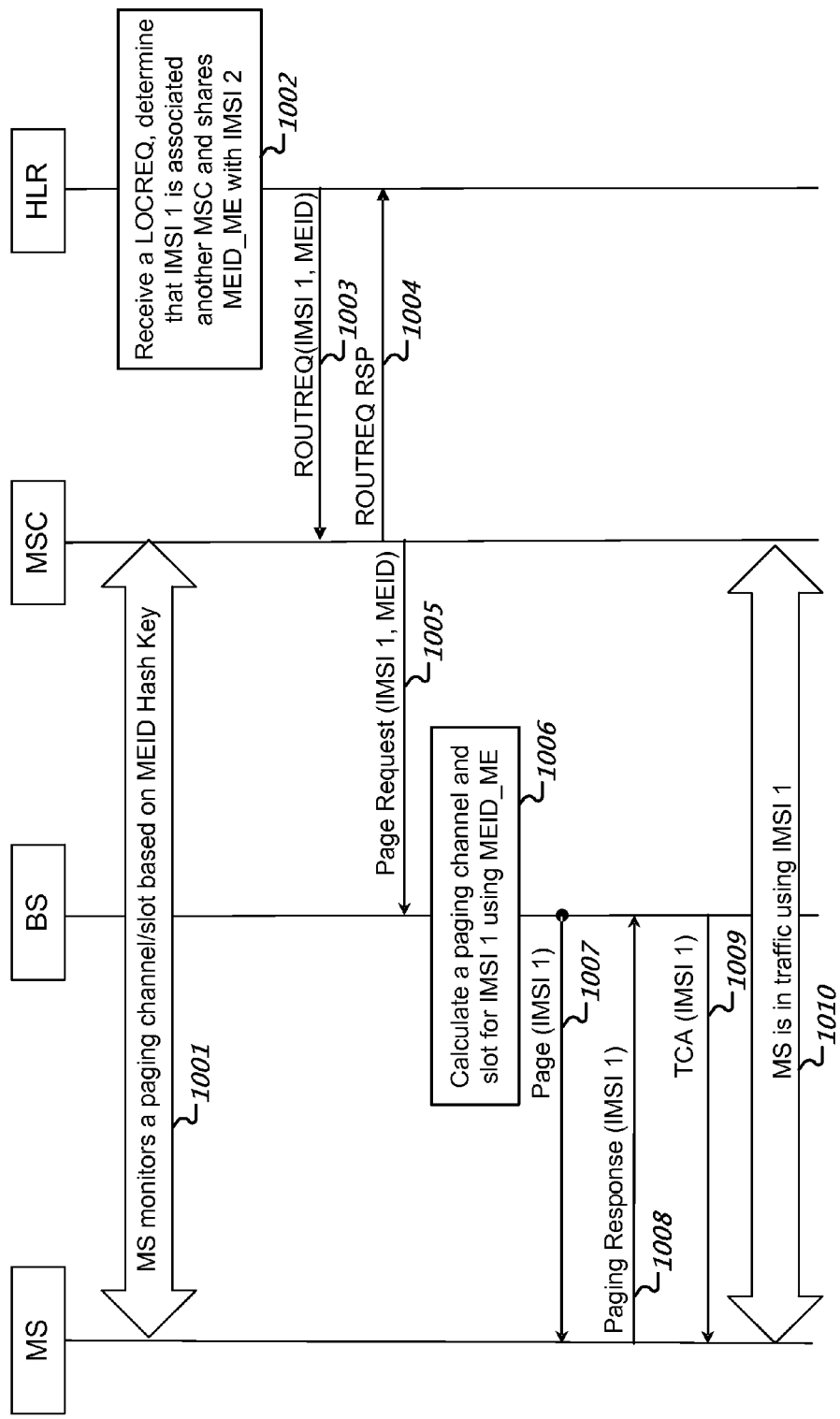
FIG. 10 shows an example of inter-MSC paging using a MEID based common hash key.

FIG. 10 shows an example of inter-MSC paging using a MEID based common hash key. In this example, a MS is associated with multiple IMSIs, including IMSI 1 and IMSI 2. At 1001, a MS monitors a paging channel and slot based on a MEID Hash Key. At 1002, a HLR receives a LOCREQ and determines that IMSI 1 is associated another MSC and shares MEID_ME with IMSI 2. At 1003, the HLR sends a routing request message, e.g., ROUTREQ, that includes IMSI 1 and MEID to the MSC. At 1004, the MSC sends a ROUTREQ acknowledgement message to the HLR. At 1005, the MSC sends a Page Request message including IMSI 1 and MEID to the BSS. At 1006, the BS calculates a paging channel and slot for IMSI 1 using MEID_ME. At 1007, the BS pages the MS based on IMSI 1. At 1008, the MS sends a Paging Response to the BSS. At 1009, the BS sends a TCA for IMSI 1. At 1010, the MS is in traffic using IMSI 1.

Figure 11:
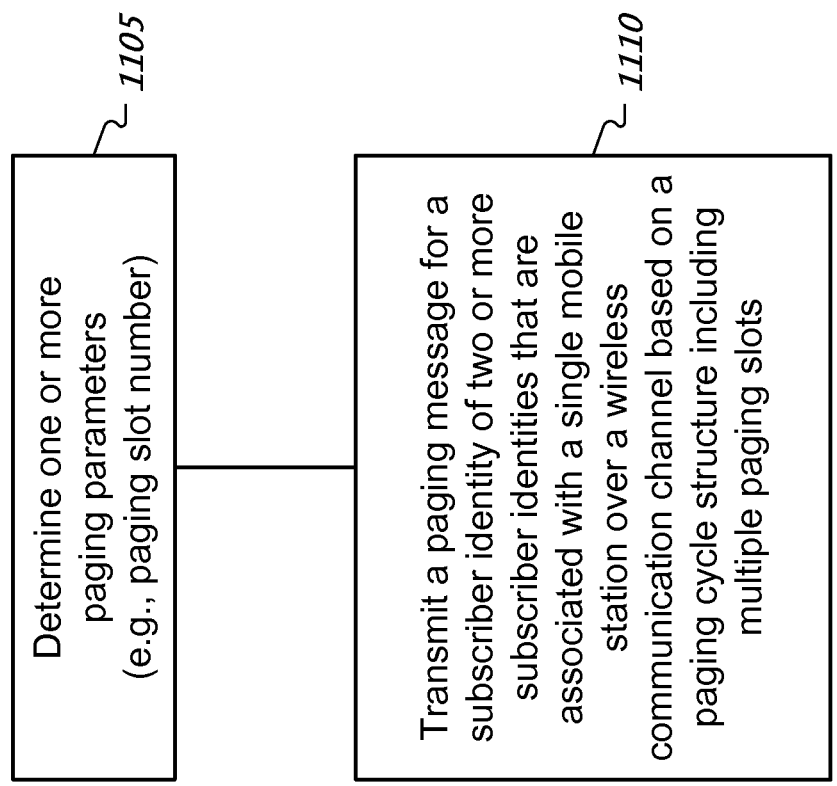
FIG. 11 shows an example of a paging process.

FIG. 11 shows an example of a paging process. A radio station such as a mobile station or a base station can determine one or more paging parameters (1105). The radio station can transmit a paging message for a subscriber identity of two or more subscriber identities that are associated with a single mobile station over a wireless communication channel based on a paging cycle structure including multiple paging slots. (1110). Transmitting the paging message can include using, during a paging cycle based on the paging cycle structure, a single paging slot to transmit the paging message. In some implementations, determining one or more paging parameters includes determining a paging slot number. In some implementations, transmitting the paging message includes transmitting the paging message at a single paging slot corresponding to the paging slot number. The single paging slot can be associated with the two or more subscriber identities.

In some implementations, a radio station can keep the first subscriber identity in a active paging mode and keep the second subscriber identity in a standby paging mode. Keeping a first subscriber identity in the paging active mode and a second subscriber identity in the paging standby mode can include operating a mobile station to use one or more signaling messages to communicate with the base station to enable the paging active mode for a first subscriber identity and the paging standby mode for the second subscriber identity. In some implementations, a base station pages the mobile station on the subscriber identity of paging standby mode through the subscriber identity in the paging active mode via sending a notification message to the mobile station first; triggering the subscriber identity in the paging standby mode to enter the paging active mode; and then paging this subscriber identity in the active paging mode after its switching from the paging standby mode.

In some implementations, a mobile station uses a hash key derived from a common value to calculate a paging channel number, paging slot number, quick paging channel number and paging indicator position to be monitored for any subscriber identity of the mobile station. In some implementations, a base station uses a hash key derived from a common value to calculate the paging channel number, paging slot number, quick paging channel number and paging indicator position for generating a page message for either the first or second subscriber identity of a dual identity mobile station. The base station can send a page message over the paging channel at a paging slot and indicator position determined by the hash function using the hash key derived from the common value.

Implementations can use values such as ESN, ESN_ME, MEID or MEID_ME of the a mobile station, an IMSI number stored in a RUIM or SIM card, UIM_ID, EXT_UIM_ID, or a value controlled by a wireless network operator as a common value. Implementations can use the 32 least significant bits of common value as the hash key of hash function for calculating the paging channel number, paging slot number, quick paging channel number and paging indicator position.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
transmitting, to a mobile station having two or more different subscriber identities, a first paging message in a first paging slot having a first index derived from a first subscriber identity, the first paging message indicating to the mobile station to begin monitoring a second paging slot having a second index derived from the second subscriber identity; and
paging the mobile station in the second paging slot.

2. The method of claim 1, comprising:
operating the first and second subscriber identities in different paging modes, wherein the first subscriber identities is operated in an active paging mode and the second subscriber identity is operated in a standby paging mode.

3. The method of claim 2, comprising:
operating the mobile station to send one or more signaling messages to enable the active paging mode for the first subscriber identity and the standby paging mode for the second subscriber identity.

4. The method of claim 2, comprising:
operating the mobile station to monitor a paging channel at a paging slot determined by a subscriber identity being operated in the active paging mode.

5. The method of claim 2, comprising:
operating the mobile station to use a hash function and an International Mobile Subscriber Identity (IMSI) of the subscriber identity being operated in the active paging mode to calculate a paging channel number and a paging slot number.

6. The method of claim 2, wherein transmitting the paging message comprises operating a base station to page the mobile station for a subscriber identity operated in the standby paging mode via a subscriber identity operated in the active paging mode.

7. The method of claim 6, wherein operating the base station to page the mobile station for the subscriber identity operated in the standby paging mode comprises sending a first message to the mobile station based on the subscriber identity operated in the active paging mode to cause the subscriber identity operated in the standby paging mode to enter operations in the active paging mode, the method further comprising:
sending a second message, during a subsequent paging cycle, to inform the mobile station about a page for the subscriber identity that entered into operations in the active paging mode.

8. The method of claim 1, comprising:
associating a common value with the first and second subscriber identities,
wherein transmitting the paging message comprises paging the mobile station based on the common value to inform the mobile station of a page for either the first or second subscriber identity.

9. The method of claim 8, wherein paging the mobile station based on the common value comprises using a paging parameter determined based on a hash function and the common value to transmit the paging message, wherein the paging parameter is one of: a paging channel number, a paging slot number, a quick paging channel number, or a paging indicator position.

10. The method of claim 8, wherein the common value is based on a unique equipment identifier associated with the mobile station.

11. The method of claim 8, wherein the common value is based on a user identifier associated with the mobile station, wherein the user identifier includes a user identity module identifier.

12. The method of claim 8, comprising:
receiving, from the mobile station, one or more signaling messages that provide the common value, wherein the one or more signaling messages comprise information that indicates an association between the common value and the first subscriber identity and information that indicates an association between the common value and the second subscriber identity, wherein associating the common value with the first and second subscriber identities comprise using the received one or more signaling messages.

13. The method of claim 8, comprising:
operating a network node to maintain an association between the common value and a subscriber identity of the multiple subscriber identities.

14. A wireless communications apparatus, at least partially implemented in hardware, comprising:
a first mechanism, configured to receive a first paging message for a first subscriber identity of two or more subscriber identities associated with a single mobile station, wherein the first mechanism is configured to monitor a first paging slot having a first index derived from the first subscriber identity to receive the paging message, and
a second mechanism, in communication with the first mechanism, configured to receive a second paging message in a second paging slot having a second index derived from the second subscriber identity.

15. The apparatus of claim 14, comprising:
a mechanism to operate the first and second subscriber identities in different paging modes, wherein the first subscriber identities is operated in an active paging mode and the second subscriber identity is operated in a standby paging mode.

16. The apparatus of claim 15, comprising:
a mechanism to send one or more signaling messages to enable the active paging mode for the first subscriber identity and the standby paging mode for the second subscriber identity.

17. The apparatus of claim 15, comprising:
a mechanism to monitor a paging channel at a paging slot determined by a subscriber identity being operated in the active paging mode.

18. The apparatus of claim 17, comprising:
a mechanism to use a hash function and an International Mobile Subscriber Identity (IMSI) of the subscriber identity being operated in the active paging mode to calculate a paging channel number and a paging slot number.

19. The apparatus of claim 17, wherein the first mechanism is configured to receive a page for a subscriber identity operated in the standby paging mode via a subscriber identity operated in the active paging mode.

20. The apparatus of claim 17, wherein the first mechanism is configured to receive a first paging message based on the subscriber identity operated in the active paging mode that causes the subscriber identity operated in the standby paging mode to enter operations in the active paging mode.

21. The apparatus of claim 20, wherein the first mechanism is configured to receive a second paging message, during a subsequent paging cycle, that includes a page for the subscriber identity that entered into operations in the active paging mode.

22. The apparatus of claim 14, comprising:
a mechanism to associate a common value with the first and second subscriber identities, wherein the paging slot number is based on the common value.

23. The apparatus of claim 22, comprising:
a mechanism to determine paging parameters based on the common value, wherein the paging parameter include one or more of: a paging channel number, a paging slot number, a quick paging channel number, or a paging indicator position.

24. The apparatus of claim 22, wherein the common value is based on a unique equipment identifier.

25. The apparatus of claim 22, wherein the common value is based on a user identifier associated with the mobile station, wherein the user identifier includes a user identity module identifier.

26. The apparatus of claim 22, comprising:
a mechanism to send one or more signaling messages that provide the common value, wherein the one or more signaling messages comprise information that indicates an association between the common value and the first subscriber identity and information that indicates an association between the common value and the second subscriber identity.

27. The apparatus of claim 14, comprising:
a mechanism to determine a paging slot number based on a common value that is associated with the two or more subscriber identities; and
a mechanism to monitor for paging messages for any of the two or more subscriber identities based on the paging slot number.

28. A system for wireless communications, comprising:
multiple base stations configured to transmit a first paging message for a first subscriber identity of two or more subscriber identities that are associated with a single mobile station over a wireless communication channel based on a paging cycle structure comprising multiple paging slots, wherein the two or more subscriber identities include a first subscriber identity and a second, different subscriber identity,
wherein the base stations are configured to use, during a paging cycle based on the paging cycle structure, a first paging slot to transmit the first paging message, wherein the first paging slot is associated with the two or more subscriber identities, indicating to the mobile station to begin monitoring a second paging slot associates with the second subscriber identity.

29. The system of claim 28, wherein the base stations are configured to operate the first and second subscriber identities in different paging modes, wherein the first subscriber identities is operated in an active paging mode and the second subscriber identity is operated in a standby paging mode.

30. The system of claim 29, wherein the base stations are configured to receive, from the mobile station, one or more signaling messages to enable the active paging mode for the first subscriber identity and the standby paging mode for the second subscriber identity.

31. The system of claim 29, wherein the base stations are configured to operate the mobile station to monitor a paging channel at a paging slot determined by a subscriber identity being operated in the active paging mode.

32. The system of claim 29, wherein the base stations are configured to operate the mobile station to use a hash function and an International Mobile Subscriber Identity (IMSI) of the subscriber identity being operated in the active paging mode to calculate a paging channel number and a paging slot number.

33. The system of claim 29, wherein the base stations are configured to page the mobile station for a subscriber identity operated in the standby paging mode via a subscriber identity operated in the active paging mode.

34. The system of claim 33, wherein the base stations are configured to send a first message to the mobile station based on the subscriber identity operated in the active paging mode to cause the subscriber identity operated in the standby paging mode to enter operations in the active paging mode,
wherein the base stations are configured to send a second message, during a subsequent paging cycle, to inform the mobile station about a page for the subscriber identity that entered into operations in the active paging mode.

35. The system of claim 28, wherein the base stations are configured to associate a common value with the first and second subscriber identities, wherein the base stations are configured to page the mobile station based on the common value to inform the mobile station of a page for either the first or second subscriber identity.

36. The system of claim 35, wherein the base stations are configured to use a paging parameter determined based on a hash function and the common value to transmit the paging message, wherein the paging parameter is one of: a paging channel number, a paging slot number, a quick paging channel number, or a paging indicator position.

37. The system of claim 35, wherein the common value is based on a unique equipment identifier associated with the mobile station.

38. The system of claim 35, wherein the common value is based on a user identifier associated with the mobile station, wherein the user identifier includes a user identity module identifier.

39. The system of claim 35, wherein the base stations are configured to receive, from the mobile station, one or more signaling messages that provide the common value, wherein the one or more signaling messages comprise information that indicates an association between the common value and the first subscriber identity and information that indicates an association between the common value and the second subscriber identity, wherein associating the common value with the first and second subscriber identities comprise using the received one or more signaling messages.

40. The system of claim 35, comprising:

a network node configured to maintain an association between the common value and a subscriber identity of the multiple subscriber identities.

* * * * *